United States Patent
Agarwala et al.

(10) Patent No.: US 7,318,176 B2
(45) Date of Patent: Jan. 8, 2008

(54) TRACING PROGRAM COUNTER ADDRESSES USING NATIVE PROGRAM COUNTER FORMAT AND INSTRUCTION COUNT FORMAT

(75) Inventors: Manisha Agarwala, Richardson, TX (US); Bryan Thome, Missouri City, TX (US); John M. Johnsen, Dallas, TX (US); Gary L. Swoboda, Sugarland, TX (US); Lewis Nardini, Dallas, TX (US); Maria B. H. Gill, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 109 days.

(21) Appl. No.: 11/383,337

(22) Filed: May 15, 2006

(65) Prior Publication Data

US 2007/0011662 A1   Jan. 11, 2007

Related U.S. Application Data

(62) Division of application No. 10/302,025, filed on Nov. 22, 2002, now Pat. No. 7,047,451.

(51) Int. Cl.
*G06F 11/00* (2006.01)

(52) U.S. Cl. .................................. 714/45; 717/128
(58) Field of Classification Search .................. None
See application file for complete search history.

(56) References Cited

U.S. PATENT DOCUMENTS

| 6,813,731 B2 | 11/2004 | Zahavi et al. |
| 6,839,869 B2 | 1/2005 | Doi et al. |
| 6,918,065 B1 | 7/2005 | Edwards et al. |
| 2002/0055830 A1 | 5/2002 | Swoboda et al. |
| 2005/0138483 A1 | 6/2005 | Hatonen et al. |

*Primary Examiner*—Marc Duncan
(74) *Attorney, Agent, or Firm*—Robert D. Marshall, Jr.; W. James Brady; Frederick J. Telecky, Jr.

(57) ABSTRACT

A method of tracing program counter activity in a data processor periodically transmits a program counter sync point including the current program counter address. Between sync points the program counter address is indicated by a program counter offset relative to the last program counter sync point. The program counter offset is sent as integral number of sections of a predetermined number of bits. Program counter sync points are transmitted often enough so that the program counter offset requires at most one less section than the program counter address.

8 Claims, 4 Drawing Sheets

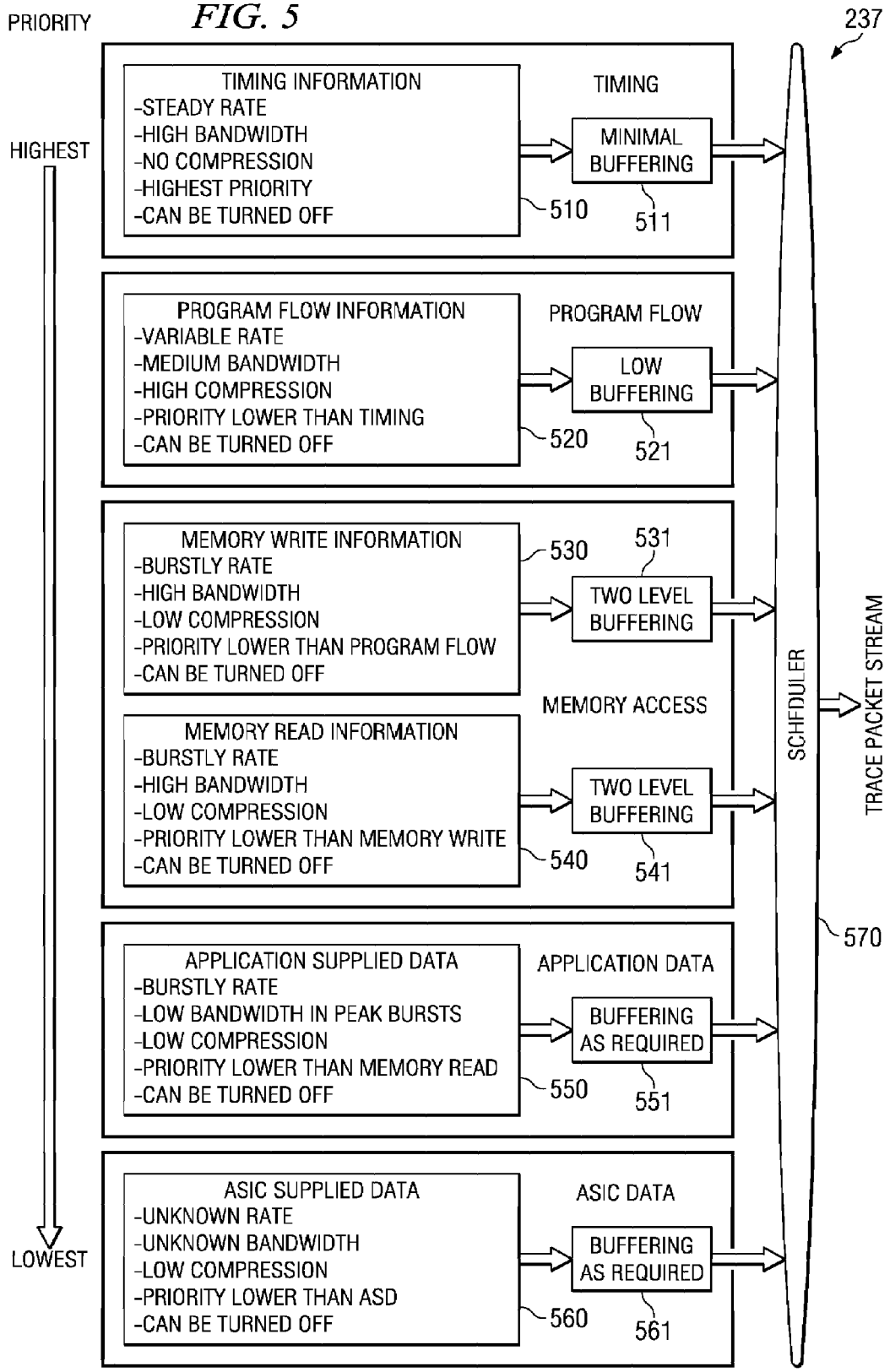

TRACING PROGRAM COUNTER ADDRESSES USING NATIVE PROGRAM COUNTER FORMAT AND INSTRUCTION COUNT FORMAT

This application is a divisional application of U.S. patent application Ser. No. 10/302,025 filed Nov. 22, 2002, now U.S. Pat. No. 7,047,451.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

There is limited bandwidth for trace stream transmission. Therefore the streams need to be compacted as much as possible such that in a limited amount of information exported to the user, the user should be able to decode the complete information.

This invention employs a relative program counter address transmission to limit the number of program counter address bytes that need to be transmitted in a program counter trace stream.

BRIEF DESCRIPTION OF THE DRAWINGS

These and other aspects of this invention are illustrated in the drawings, in which:

FIG. 5 illustrates in block diagram form a detail of the trace packet merge block of FIG. 4.

DETAILED DESCRIPTION OF PREFERRED EMBODIMENTS

This invention alleviates the program counter trace bandwidth problem. It reduces the total number of bits that need to be exported to specify the program counter address at which the data log occurred.

Figure 1:
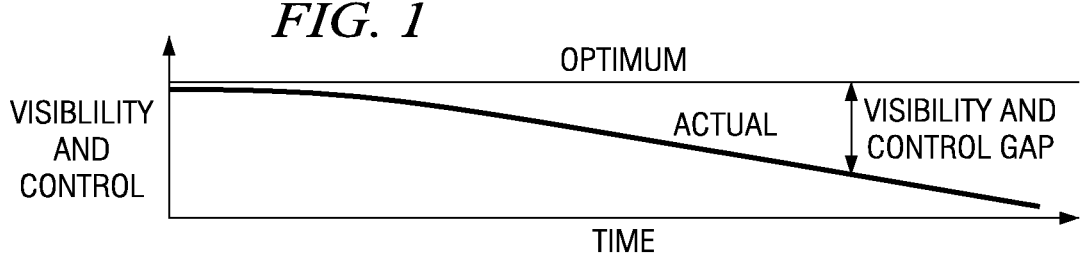
FIG. 1 illustrates the visibility and control of typical integrated circuits as a function of time due to increasing system integration.
Figure 2:
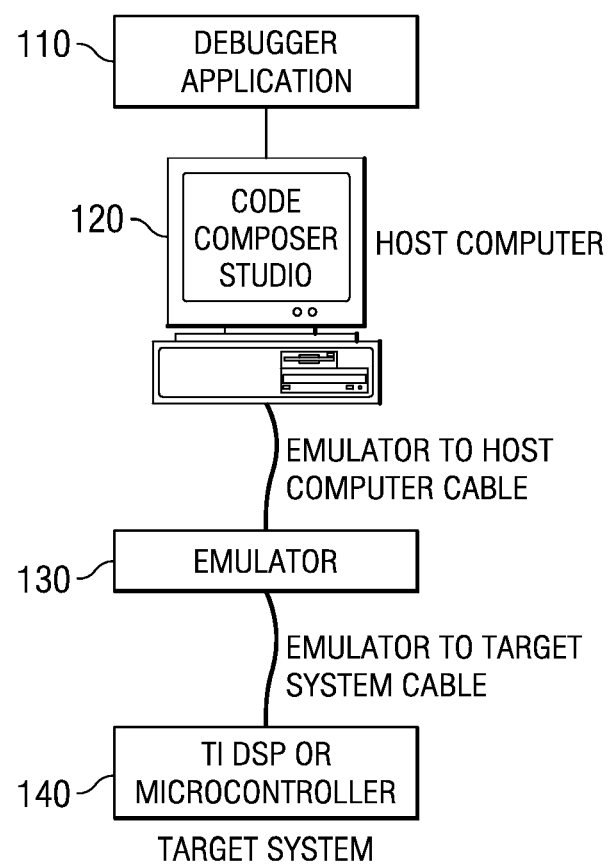
FIG. 2 illustrates an emulation system to which this invention is applicable.
Figure 3:
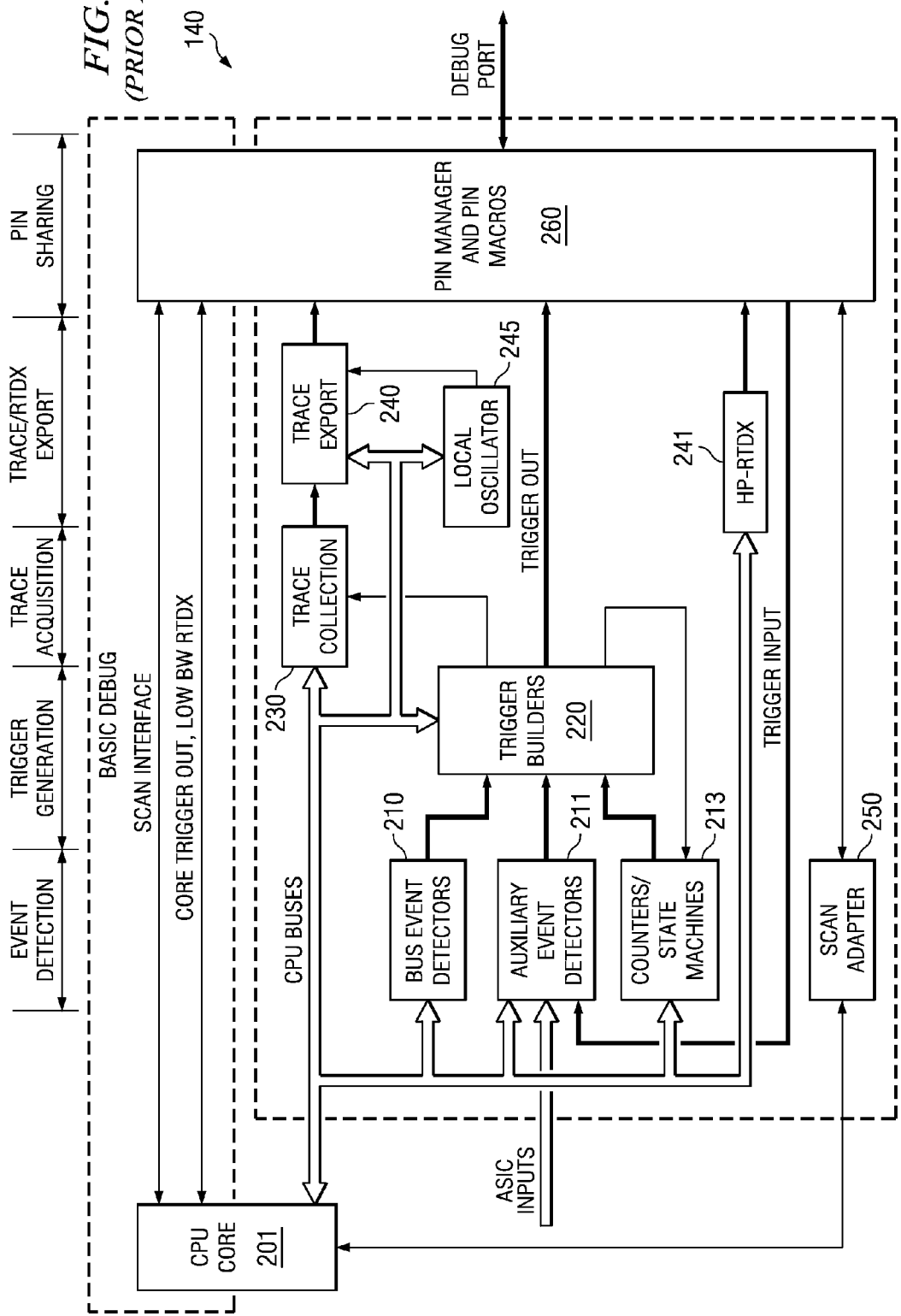
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Consider the case of tracing data processor activity and generating timing, program counter and data streams. Table 1 shows an example relationship between these trace streams and their respective sync points. There is no order dependency of the various trace streams with each other. However within each trace stream the order cannot be changed between sync points.

TABLE 1

| Timing stream | PC stream | Data stream |
| --- | --- | --- |
| Timing sync point, id = 1 | PC sync point, id = 1 | Data sync point, id = 1 |
| Timing data | | |
| | PC data | Memory Data |
| Timing data | | Memory Data |
| Timing data | PC data | Memory Data |
| | PC data | |
| Timing data | | Memory Data |
| Timing sync point, id = 2 | PC sync point, id = 2 | Data sync point, id = 2 |

Sync points are generated whenever the timing or program counter trace stream switch on or off. They are also generated after a certain number of active cycles have expired. Context information is provided only in the program counter stream. Program counter sync point contains the full program counter address for the cycle at which it was generated. There is no requirement that for any one stream to be ON, the other stream has to be ON as well. Therefore data tracing can be done in conjunction with the program counter stream or by itself. The flow of the program counter data in the program counter trace stream, informs the user of the program counter address at any point of time. The user has complete knowledge of the program count value, if he starts decoding from a program counter sync point.

Figure 4:
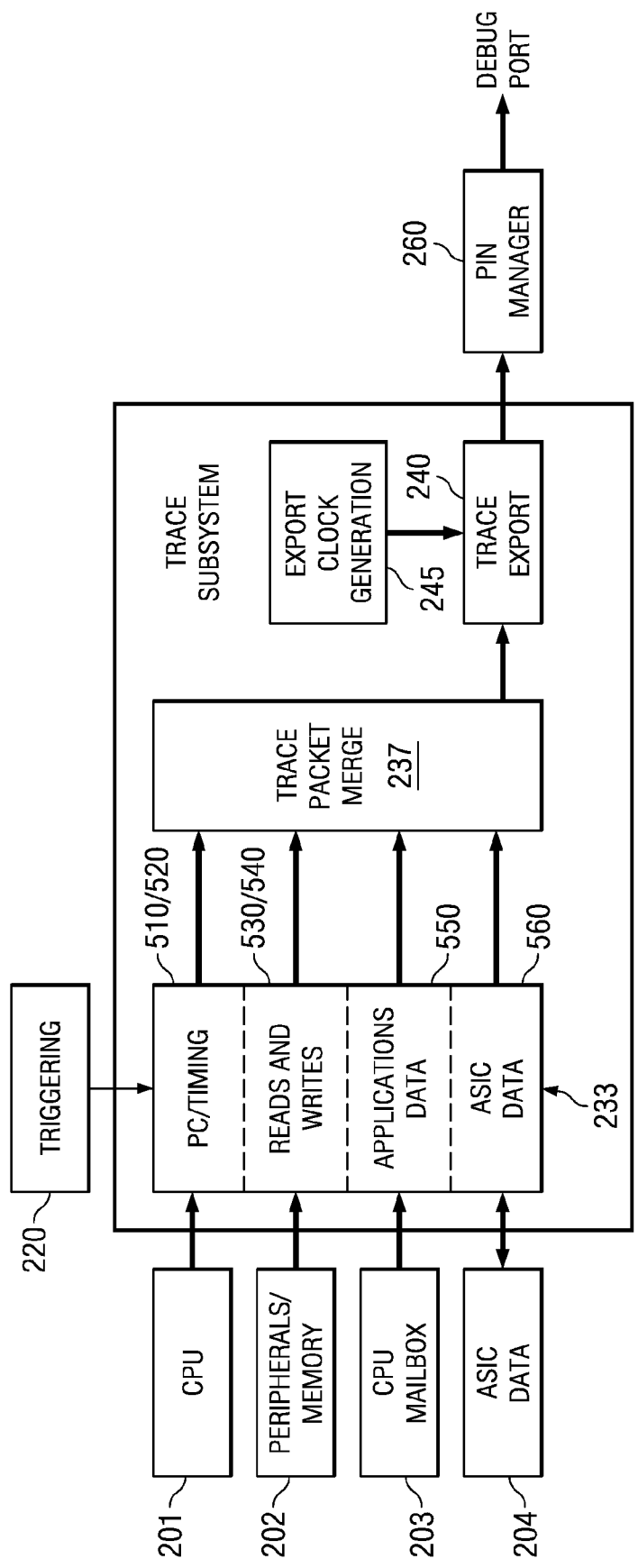
FIG. 4 illustrates in block diagram form a detail of trace subsystem.

FIG. 4 illustrates a detail of the trace subsystem. Data to be traced is generated by central processing unit core 201, peripheral and memory system 202, the central processing unit mailbox 203 and application specific integrated circuit (ASIC) data source 204. Central processing unit core 201 generates program counter and timing data. Peripherals and memory system 202 generates memory read and write access addresses and corresponding data. Central processing unit mailbox 203 generates data handled by application programs. ASIC data source 204 generates data from special purpose hardware particular to that integrated circuit. These trace data sources supply data to trace collection subunit 233. Trace collection subunit 233 includes separate sections for receipt of program counter/timing data from central processing unit core 201 (sections 510/520), memory read and writes from peripheral and memory system 202 (sections 530/540), application program data from central processing unit mailbox 203 (section 550) and ASIC data from ASIC data source 204 (section 560). Trace collection subunit 233 also receives triggering signals from trigger builders 220. Trace collection subunit 233 produces plural separate data streams corresponding to the received trace data.

Trace packet merge unit 237 receives the plural trace data streams from trace collection subunit 233. Trace packet merge unit 237 merges these plural data streams into a single trace data stream. Trace packet merge unit 237 supplies this merged trace data stream to trace export 240. Trace export 240 drives pin manager 260 under timing control of export clock generator 245 (corresponding to local oscillator 245 illustrated in FIG. 3).

FIG. 5 illustrates in block diagram form a detail of the trace packet merge unit 237. FIG. 5 illustrates six separate trace data streams that must be merged for output. Timing information 510 comes from central processing unit core 201, has a steady rate and a high average bandwidth. It is typically output without compression. Trace packet merge unit 237 gives this data the highest priority. Because of its high priority, trace information 510 can be buffered in first-in-first-out (FIFO) buffer 511 with a small capacity. The high priority ensures that the small FIFO buffer 511 will not overflow.

Program counter flow information 520 also comes from central processing unit core 210. Program counter flow information 520 follows the path of program execution of central processing unit core 201. Program counter flow information has a variable rate and a medium average bandwidth. It is typically transmitted with high compression. Trace packet merge unit 237 gives this data the second highest priority just lower than timing information. The medium bandwidth and high compression require a small FIFO buffer 521.

Memory write information 530 comes from peripherals and memory system 202. The information flow occurs primarily in bursts of high activity interspersed with times of low activity. This memory write information 530 is typically transmitted with low compression. A high bandwidth is required to accommodate the bursts. Trace packet merge unit 237 gives this data an intermediate priority just lower than program counter flow information 520. The irregular rate and low compression require a large FIFO buffer 531.

Memory read information 540 also comes from peripherals and memory system 202. Memory read information 540 is similar to memory write information 530. Memory read information 540 occurs primarily in bursts of high activity interspersed with times of low activity and is generally transmitted with low compression. A high bandwidth is required to accommodate the bursts. Trace packet merge unit 237 gives this data an intermediate priority just lower than memory write information 530. The irregular rate and low compression require a large FIFO buffer 541.

Application supplied data 550 comes from central processing unit mailbox 203. It is difficult to characterize this data because it varies depending on the application program running on central processing unit 201. Application supplied data 550 is generally believed to occur in bursts with a low average bandwidth. This data is typically transmitted with low compression. Application supplied data 550 has a low priority in trace packet merge unit 237 below that of the memory write information 530 and memory read information 540. The particular application program determines the size required of FIFO buffer 551.

ASIC supplied data 560 comes from (ASIC) data source 204. The data rate, required bandwidth and required size of FIFO buffer 561 depend on the particular integrated circuit and can't be generalized. Trace packet merge unit 237 gives this data the lowest priority.

Scheduler 570 receives data from the six FIFO buffers 511, 521, 531, 541, 551 and 561. Scheduler 570 merges these separate data streams into a single trace packet stream for export via the debug port (FIGS. 3 and 4).

The timing stream gets the highest priority on the read side as long as the timing and program counter data stay in the range of seven sync points. The program counter stream gets the next highest priority and the data stream gets the lowest priority. Timing packets can be sent out at any time even though there may be incomplete program counter or memory packets. Sending memory packets can be intervened by a program counter packet provided the data log is at an interruptible boundary. An interruptible boundary for data trace is the boundary after sending out the entire data value and before the data address or program counter address.

The complete program counter value at which the data log occurred to is referred to as the "native program counter". In a simple solution this is the value that would be transmitter to completely identify the program counter address of the data log. However with the program counter trace, this problem can be solved a little differently.

If program counter stream is enabled, the user has knowledge of the program counter address at any point of time. This is achieved by starting decoding from a program counter sync point. If the relative distance of a data log occurring after this sync point is known by the user, then the user can easily infer the program counter address of the data log. This relative distance is referred to as "instruction count format".

Consider an example where that the program counter sync point occurred at address 0x10000000. The inferred address is the program counter sync point address plus the relative offset. Table 2 shows an example. The distance column lists the relative offset from the program counter sync point. To ensure this distance is always a positive number, it is implemented as the total number of non-stall cycles that have expired since the sync point. Inferred address is the address that the user will calculate based on the information of the program counter sync point address and the relative offset. The number of bytes required to send a native program counter address is four for a 32 bit wide address. The Saved bytes column lists the number of bytes that one would save if only the relative offset is sent instead of the native program counter.

TABLE 2

| Distance from sync point | Inferred Address | Bytes to send relative offset | Saved bytes |
|---|---|---|---|
| 0x00000002 | 0x10000002 | 1 | 3 |
| 0x00000020 | 0x10000020 | 1 | 3 |
| 0x00000200 | 0x10000200 | 2 | 2 |
| 0x00002000 | 0x10002000 | 2 | 2 |
| 0x00020000 | 0x10020000 | 3 | 1 |
| 0x00200000 | 0x10200000 | 3 | 1 |
| 0x02000000 | 0x12000000 | 4 | 0 |
| 0x20000000 | 0x30000000 | 4 | 0 |

The extra bytes sent for the larger relative offsets from the sync point limit the benefit of the instruction count format. This can be overcome by ensuring that the sync points always come out after a certain number of cycles. A new reference address is transmitted with each sync point. At that point, the user can reset the relative offset to 0. This way, the offset value can be limited to save 3, or 2, or 1 byte at the very little overhead of sending an extra sync point.

When program counter tracing is OFF, the trace data stream sends the native program counter which converts to 4 bytes (32 bits) of data each time.

What is claimed is:

1. A data processor trace circuit comprising:
a triggering circuit receiving first signals indicative of data processing activity of the data processor and generating corresponding triggering signals;
a program counter trace collection unit connected to said triggering circuit and receiving signals indicative of the value of a program counter of the data processor, said program counter trace collection unit generating a program counter data stream when triggered by corresponding triggering signals;
at least one secondary trace collection unit connected to said triggering circuit and receiving second signals indicative of data processing activity of the data processor, each secondary trace collection unit generating corresponding secondary trace data stream when triggered by corresponding triggering signals; and
a trace packet merge unit connected to said program counter trace collection unit and each secondary trace collection unit, said trace packet merge unit generating a single trace data stream from said program counter data stream and each secondary trace data stream, said trace packet merge unit operable to
periodically transmit a program counter sync point including the current program counter address, said step of periodically transmitting a program counter sync point transmits a program counter sync point upon each termination of program counter trace, and
periodically transmit a program counter offset corresponding to the difference between the current program counter address and the program counter address of a last program counter sync point until transmission of a next program counter sync point.

2. The data processor trace circuit of claim 1, wherein:
said trace packet merge unit is further operable to transmit a program counter sync point upon each initiation of program counter trace.

3. The data processor trace circuit of claim 1, wherein:
said trace packet merge unit is further operable to transmit a program counter sync point at least each predetermined number of instruction cycles since a last program counter sync point.

4. The data processor trace circuit of claim 3, wherein:
said trace packet merge unit is further operable to
- divide said program counter address into a predetermined number of sections each having a predetermined number of bits,
- transmit a program counter offset including a integral number of said sections, and
- select said predetermined number of cycles whereby said program counter offset requires at most one less section than the predetermined number of sections of said program counter address.

5. The data processor trace circuit of claim 4, wherein:
said program counter address is 32 bits and is divided into 4 sections of 8 bit each; and
said program counter offset includes one of 8 bits, 16 bits or 24 bits.

6. The data processor trace circuit of claim 1, wherein:
said at least one secondary trace collection unit includes a periphery and memory trace collection unit receiving signals indicative of memory reads and writes in the data processor.

7. The data processor trace circuit of claim 1, wherein:
said at least one secondary trace collection unit includes a central processing unit mailbox trace collection unit receiving signals indicative of application program data.

8. The data processor trace circuit of claim 1, wherein:
said at least one secondary trace collection unit includes an application specific integrated circuit trace collection unit receiving signals indicative of application specific integrated circuit data.

* * * * *